(12) United States Patent
Endo et al.

(10) Patent No.: US 8,652,984 B2
(45) Date of Patent: Feb. 18, 2014

(54) DIELECTRIC CERAMIC COMPOSITION

(75) Inventors: Makoto Endo, Tokyo (JP); Osamu Kido, Tokyo (JP); Hirobumi Tanaka, Tokyo (JP); Taisuke Masuko, Tokyo (JP); Yusuke Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 49 days.

(21) Appl. No.: 13/416,596

(22) Filed: Mar. 9, 2012

(65) Prior Publication Data

US 2012/0238438 A1 Sep. 20, 2012

(30) Foreign Application Priority Data

Mar. 16, 2011 (JP) ................................. 2011-058427

(51) Int. Cl.
*C04B 35/468* (2006.01)
(52) U.S. Cl.
USPC ........... 501/137; 501/138; 501/139; 428/701; 428/702
(58) Field of Classification Search
USPC ............................ 501/134–139; 428/701, 702
See application file for complete search history.

(56) References Cited

U.S. PATENT DOCUMENTS

| 8,192,851 B2 * | 6/2012 | Aman et al. ................... 428/701 |
| 8,450,230 B2 * | 5/2013 | Tamura et al. ................ 501/139 |
| 2008/0226944 A1 * | 9/2008 | Aman et al. ................... 428/697 |

FOREIGN PATENT DOCUMENTS

JP A-2001-230149 8/2001

* cited by examiner

*Primary Examiner* — Karl Group
(74) *Attorney, Agent, or Firm* — Oliff PLC

(57) ABSTRACT

A dielectric ceramic composition comprising a main component and at least one or more subcomponent elements has a dielectric particle and a grain boundary. The dielectric particle has a main component phase substantially composed of the main component, and a diffusive phase around the main component phase where at least one selected from the subcomponent elements is diffused, a local minimal value of Cs is located at an outside edge side with respect to a position of the local maximum value of Cs, and Cs is increased from a position of the local minimal value of Cs toward the outside edge, when the dielectric particle is cut on an arbitrary cutting plane including the main component phase, and Cs is defined as a concentration of one or more elements selected from the subcomponent elements in an arbitrary position in the dielectric particle.

8 Claims, 10 Drawing Sheets

DIELECTRIC CERAMIC COMPOSITION

BACKGROUND OF THE INVENTION

1. Field of the Invention

The present invention relates to a dielectric ceramic composition, and specifically relates to a dielectric ceramic composition which is high in specific permittivity and is reliable regardless of composition of components included in the dielectric ceramic composition.

2. Description of the Related Art

Recently, downsizing and improved performance of electronic components have been highly demanded as growing density of electronic circuits, which results in, for example, further downsizing and increased capacity of a multilayer ceramic capacitor, and further improvements in properties are required.

In response to these demands, technology to improve properties by a dielectric ceramic composition constituting a dielectric layer which includes a dielectric particle comprising a main component phase substantially composed of a main component and a diffusive phase where a subcomponent element is diffused in the main component, has been studied.

For example, Japanese Unexamined Patent Publication No. 2001-230149 discloses a multilayer ceramic capacitor wherein a dielectric particle comprises a main component phase (core portion) and a diffusive phase (shell portion), and a concentration of an acceptor type element (Mn, V, Cr, Co and Mo) included in the diffusive phase is increased from a boundary between the main component phase and the diffusive phase toward a grain boundary.

However, as for concentration distribution of a subcomponent element in a dielectric particle, it has not conventionally studied to increase a concentration of the subcomponent element not only near the surface of the dielectric particle but also near the boundary between the main component phase and the diffusive phase.

SUMMARY OF THE INVENTION

The present invention has been made in view of the above situation, and aims at providing a dielectric ceramic composition which has high specific permittivity and is reliable.

The present inventors have found it possible to attain the above purpose by making a subcomponent element show a predetermined concentration distribution in a dielectric particle constituting a dielectric ceramic composition as a result of keen examination for attaining the above purpose, and thus completed the present invention.

Namely, the dielectric ceramic composition according to the present invention for solving the above problem is a dielectric ceramic composition comprising a main component having a perovskite-type crystal structure expressed by a general formula $ABO_3$, and at least one or more subcomponent elements, wherein said dielectric ceramic composition has a dielectric particle and a grain boundary, said dielectric particle has a main component phase substantially composed of said main component, and a diffusive phase around said main component phase in which at least one selected from said subcomponent elements is diffused, a local maximum value of Cs exists in an intermediate section which is between a position corresponding to a length of 10% of a length "D" of a cross-sectional line from an outside edge of the particle and a position corresponding to a length of 30% of the length "D" of said cross-sectional line from said outside edge, and a local minimal value of Cs is located at an outside edge side with respect to a position of said local maximum value of Cs, and Cs is increased from a position of said local minimal value of Cs toward said outside edge, when said dielectric particle is cut on an arbitrary cutting plane including said main component phase, and Cs is defined as a concentration of one or more elements selected from said subcomponent elements in an arbitrary position in said dielectric particle, and "D" is defined as a length of a cross-sectional line from an arbitrary outside edge of the dielectric particle in said cutting plane passing through a centroid of the main component phase in said cutting plane to a facing arbitrary outside edge.

According to the present invention, it is possible to obtain a dielectric ceramic composition having high specific permittivity and being reliable.

The local maximum value of Cs preferably exists in the outside edge of said dielectric particle.

Said dielectric ceramic composition preferably satisfies the following relational expression (1) for Csi and Cso when said local maximum value of Cs in said intermediate section is defined as Csi, and Cs in said outside edge is defined as Cso, $$0 \text{ atom \%} < Csi - Cso \leq 1 \text{ atom \%} \quad (1)$$

Said dielectric ceramic composition preferably includes at least 1 rare-earth element selected from Y, La, Ce, Pr, Nd, Sm, Eu, Gd, Tb, D y, Ho, Er, Tm, Yb, Lu, Pr and Sc for said subcomponent elements, and said Cs is a total concentration of the rare-earth elements in an arbitrary position in the dielectric particle.

Said dielectric ceramic composition preferably includes at least Mg for said subcomponent elements, and said Cs is a concentration of Mg in an arbitrary position in the dielectric particle.

DETAILED DESCRIPTION OF THE INVENTION

Figure 1:
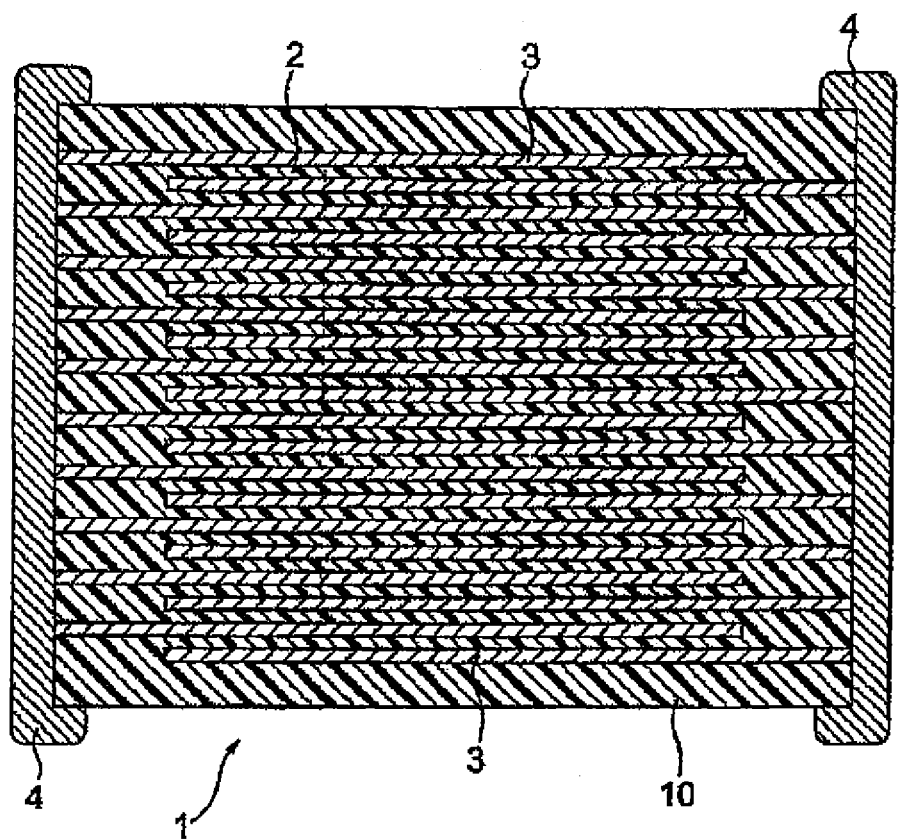
FIG. 1 is a cross-sectional view of a multilayer ceramic capacitor according to an embodiment of the present invention.

Hereinafter, the present invention will be explained with reference to the embodiment shown in the drawings.

<Multilayer Ceramic Capacitor 1>

A multilayer ceramic capacitor 1 according to an embodiment of the present invention as shown in FIG. 1 comprises a capacitor device body 10 wherein dielectric layers 2 and internal electrode layers 3 are alternately stacked. On both ends of the device body 10, a pair of external electrodes 4 is formed, which conduct to the internal electrode layers 3 alternately arranged inside the device body 10 respectively. The shape of the device body 10 is not particularly limited and normally a rectangular parallelepiped. Also, the size is not particularly limited, and may properly be determined depending on the intended use.

<Dielectric Layer 2>

The dielectric layer 2 is constituted by the dielectric ceramic composition according to the embodiment of the present invention. The dielectric ceramic composition is composed of a dielectric particle which includes a compound being expressed by a general formula $ABO_3$ and having perovskite-type crystal structure as a main component, and at least one or more of subcomponent elements.

In the general formula $ABO_3$, "A" site atom is preferably at least one selected from a group consisting of Ba, Ca and Sr, and "B" site atom is preferably at least one selected from a group consisting of Ti, Zr and Hf.

Also, a mole ratio of the "A" site atom and the "B" site atom is expressed by A/B ratio, and the A/B ratio is preferably 0.98 to 1.02 in the present embodiment.

The subcomponent element is not particularly limited, and preferably includes at least one selected from rare-earth elements and Mg.

Content of the rare-earth element as the subcomponent element may be determined depending on desired properties, and when the rare-earth element is expressed by "R", the content is preferably 0.2 to 2.5 moles per 100 moles of $ABO_3$ in terms of $R_2O_3$. Inclusion of the oxide can result in advantage to improve high temperature accelerated lifetime.

The rare-earth element is at least one selected from a group consisting of Sc, Y, La, Ce, Pr, Nd, Pm, Sm, Eu, Gd, Tb, Dy, Ho, Er, Tm, Yb and Lu, and is preferably at least one selected from a group consisting of Y, Dy, Gd and Ho.

Content of the Mg element may be determined depending on desired properties, and is preferably 0.2 to 2.5 moles per 100 moles of $ABO_3$ in terms of MgO. Inclusion of the oxide can result in advantages to obtain desired capacitance-temperature characteristics and high temperature accelerated lifetime.

Content of the Si element may be determined depending on desired properties, and is preferably 0.2 to 3.0 moles per 100 moles of $ABO_3$ in terms of $SiO_2$. Inclusion of the oxide can mainly result in improvement of sinterability of the dielectric ceramic composition. Note that the oxide including Si may be a composite oxide of Si and other metal element (e.g., alkali metal or alkali earth metal), etc., and is preferably a composite oxide of Si with Ba and Ca, i.e. (Ba, Ca) $SiO_3$, in the present embodiment.

In the present embodiment, the above dielectric ceramic composition may further include other subcomponents depending on desired properties.

For example, the dielectric ceramic composition according to the present embodiment may include Mn and/or Cr. Content of these elements is preferably 0.02 to 0.30 mole per 100 moles of $ABO_3$ in terms of each oxide.

Also, the dielectric ceramic composition according to the present embodiment may include at least one element selected from V, Ta, Nb, Mo and W. Content of the element is preferably 0.02 to 0.30 mole per 100 moles of $ABO_3$ in terms of each oxide.

The thickness of the dielectric layer 2 is not particularly limited and may be properly determined depending on desired properties, intended use and the like. Also, the number of stacking of the dielectric layers 2 is not particularly limited, and is preferably 20 or more, more preferably 50 or more, particularly preferably 100 or more.

<Structure of Dielectric Ceramic Composition>

Figure 2:
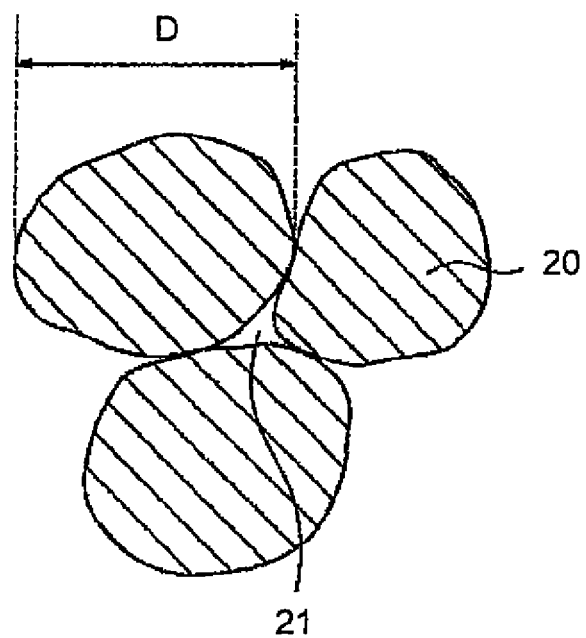
FIG. 2 is an enlarged cross-sectional view showing major parts of a dielectric layer 2 shown in FIG. 1.

As shown in FIG. 2, the dielectric ceramic composition constituting the dielectric layer 2 has a dielectric particle 20 and a grain boundary 21 formed between abutting dielectric particles 20.

Figure 3A:
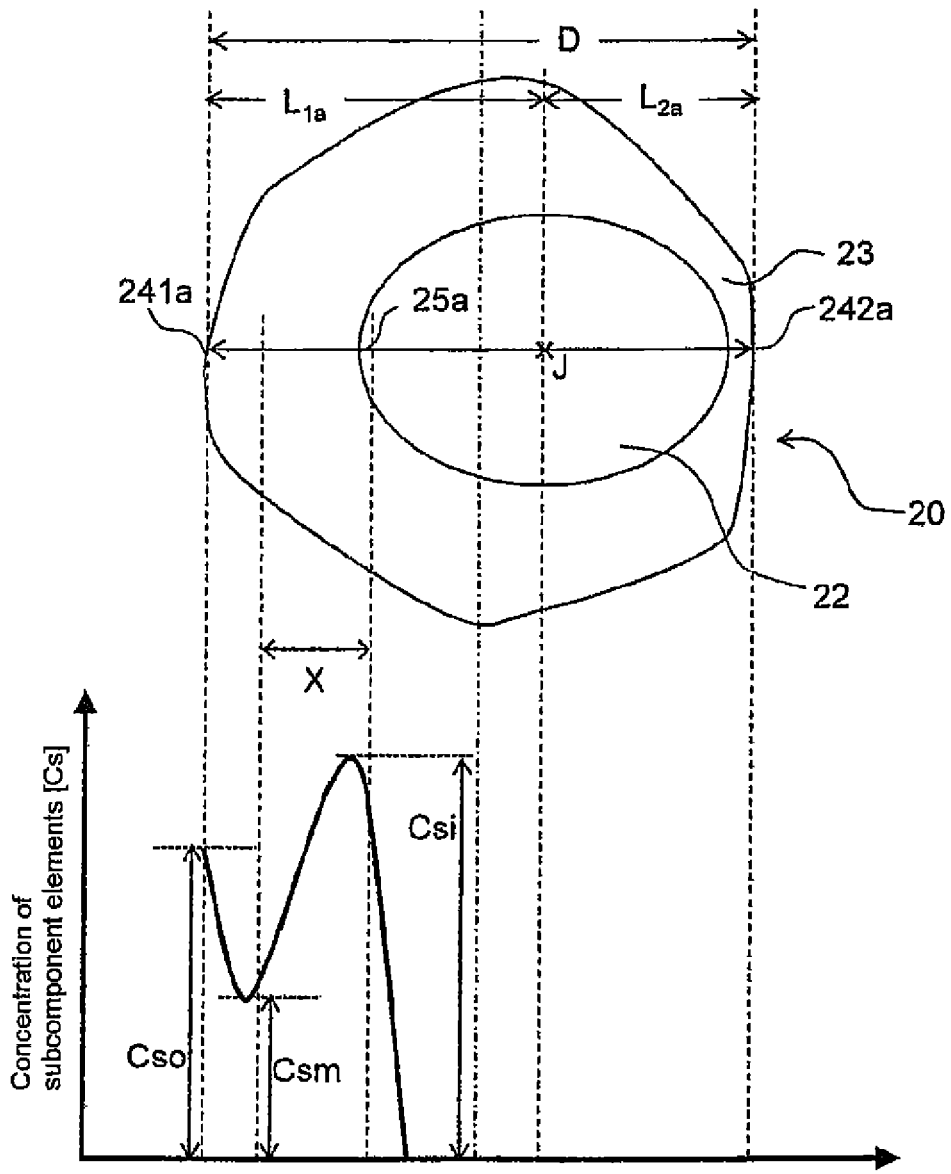
FIG. 3A is a cross-sectional view of a dielectric particle 20 shown in FIG. 2 and a pattern diagram of a concentration distribution of subcomponent elements in the dielectric particle.
Figure 3B:
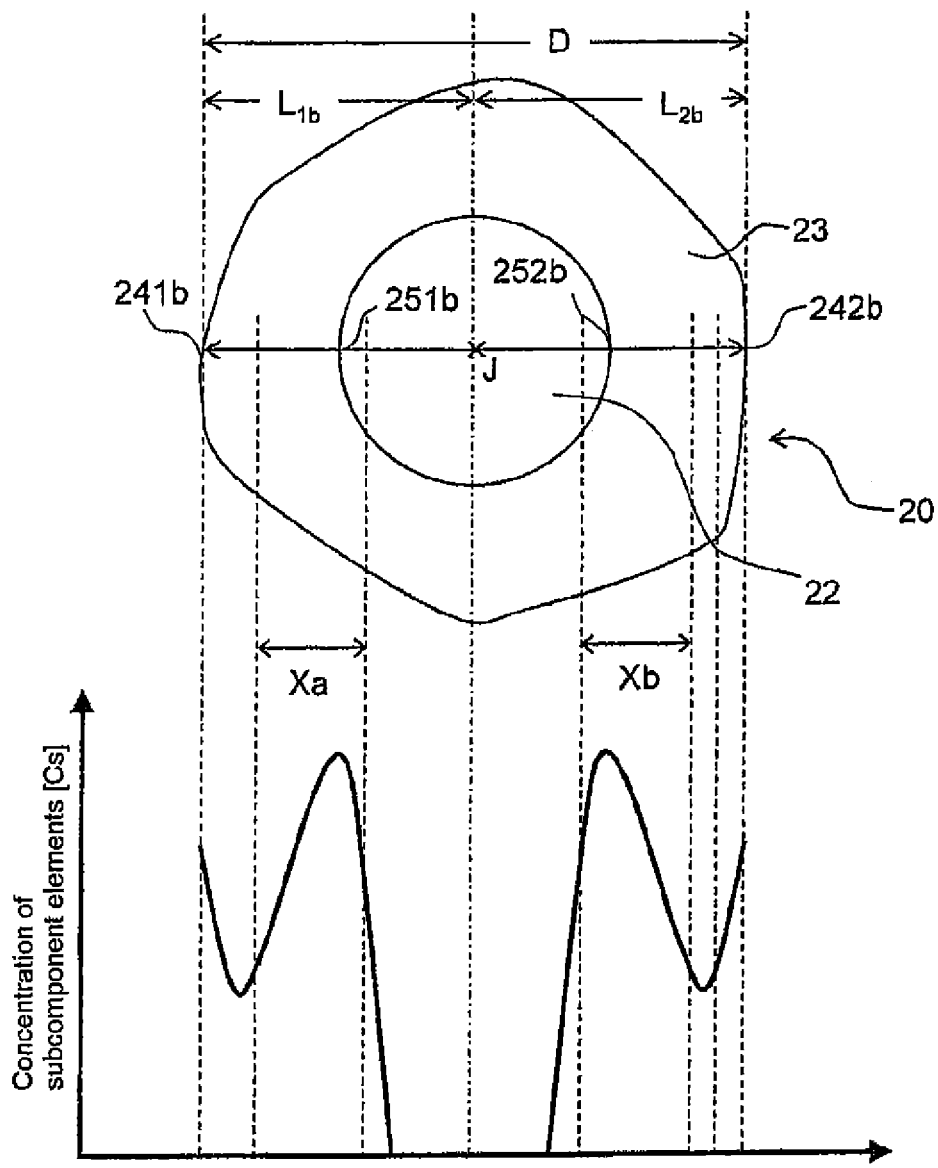
FIG. 3B is a cross-sectional view of a dielectric particle 20 shown in FIG. 2 and a pattern diagram of a concentration distribution of the subcomponent elements in said dielectric particle.
Figure 3C:
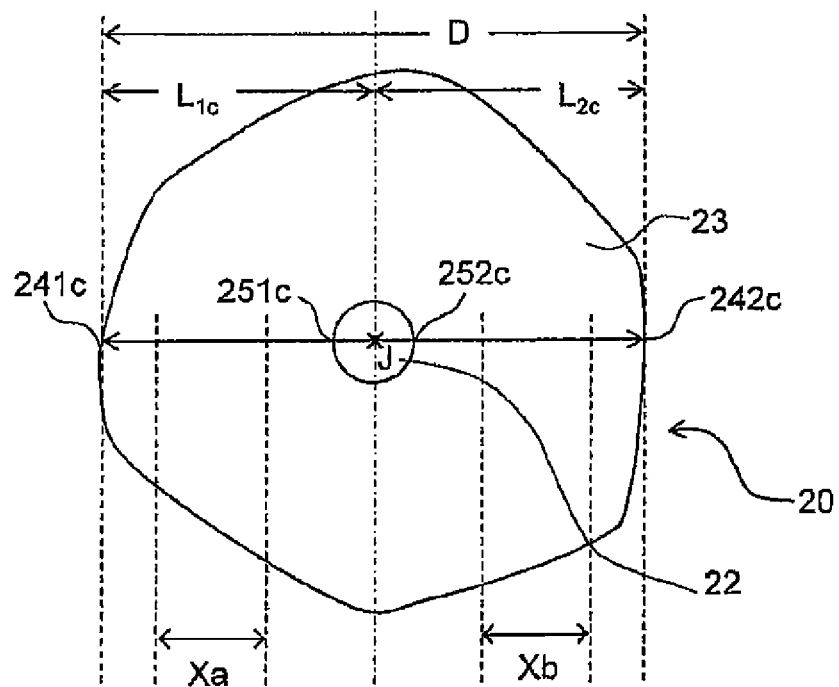
FIG. 3C is a cross-sectional view of a dielectric particle 20 shown in FIG. 2.

Also, the dielectric particle 20 of the present embodiment comprises, as shown in FIG. 3A, FIG. 3B and FIG. 3C, a main component phase 22 substantially composed of the main component, and a diffusive phase 23 present around the main component phase in which at least one or more elements selected from the subcomponent elements are diffused. Note that FIG. 3A, FIG. 3B and FIG. 3C are a cross-sectional view of the dielectric particle 20 for explaining an intraparticle structure of the dielectric particle 20 shown in FIG. 2 and a pattern diagram of concentration distribution of the subcomponent elements within the dielectric particle.

The main component phase is substantially constituted by the main component. The term "substantially" here means that the subcomponent element may be included in addition to the main component at 0.5 atom % to 1.0 atom % in terms of an element excluding oxygen. Note that "atom %" here means a rate of total amount of subcomponent elements to total amount of elements excluding oxygen.

The diffusive phase 23 may be formed by diffusing at least one or more selected from the subcomponent elements in the main component having a perovskite-type crystal structure expressed by the general formula $ABO_3$, and it is preferable that the diffusive phase of the present embodiment is formed by diffusing at least one or more selected from at least rare-earth elements and Mg as the subcomponent element.

In the present embodiment, concentration of one or more elements selected from the subcomponent elements in an arbitrary position in the dielectric particle is defined as "Cs".

In the present embodiment, as shown in FIG. 3A, the concentration "Cs" of at least one or more elements selected from the subcomponent elements shows the following distribution when the dielectric particle 20 is cut in an arbitrary cutting plane including the main component phase 22 of the dielectric particle 20.

Note that when 2 or more rare-earth elements are included as the subcomponent elements, only the concentration of one of the rare-earth elements included as the subcomponent elements may show the following distribution, or the total concentration of two or more rare-earth elements included as the subcomponent elements may show the following distribution.

In the present embodiment, as shown in FIG. 3A, a line segment starting from an arbitrary outside edge 241a of the dielectric particle 20 in the cutting plane and passing through the centroid "J" of the main component phase 22 in the cutting plane to the facing arbitrary outside edge 242a is defined as a cross-sectional line, and the length of the cross-sectional line is defined as "D".

Then, an interval on the cross-sectional line between the position of 10% of the length "D" of the cross-sectional line from the outside edge and the position of 30% of the length "D" of the cross-sectional line from the outside edge is defined as an intermediate section "X".

The dielectric ceramic composition according to the present embodiment includes the dielectric particle having the local maximum value of Cs in the distribution of Cs from the outside edge to the centroid "J" within the intermediate section "X".

The subcomponent elements included in the diffusive phase 23 contribute to increase in resistance of the dielectric ceramic composition. In the conventional technologies disclosed in Japanese Unexamined Patent Publication No. 2001-230149 and the like, the concentration of the subcomponent elements tend to increase more as being closer to the outside edge of the particle from the center of the dielectric particle. However, in the concentration distribution in the dielectric particle of the conventional technology, a load of voltage tends to be concentrated near the grain boundary. As a result, the grain boundary which contributes to improvement of reliability may be deteriorated in a short time to show a tendency to reduce reliability.

In contrast to this, the local maximum value of the concentration of the subcomponent element is present in the intermediate section "X" near the main component phase in the present embodiment. Because of this, the load of voltage can be dispersed near the grain boundary of the dielectric particle and in the intermediate section "X". As a result, deterioration of the grain boundary can be inhibited to improve reliability.

The intermediate section "X" indicates a section between the position of 10% of the length "D" of the cross-sectional line from the outside edge 24a and the position of 30% of the length "D" of the cross-sectional line from the outside edge on the cross-sectional line. By making the intermediate section into this section, specific permittivity of the dielectric ceramic composition can be good and reliability tends to be high.

In the present embodiment, the line segment for measuring the distribution of Cs is preferably a line segment from the outside edge to the centroid "J" of the main component phase in the cutting plane.

The length of the line segment from the outside edge to the centroid "J" of the main component phase in the cutting plane for measuring the distribution of Cs is preferably 40% to 70% of the length "D" of the cross-sectional line.

When the length from the outside edge to the centroid "J" of the main component phase in the cutting plane satisfies the above condition, the local maximum value of Cs is preferably in the intermediate section. On the other hand, when the length from the outside edge to the centroid "J" of the main component phase in the cutting plane and the length "D" of the cross-sectional line do not satisfy the above condition, it is not required that the local maximum value of Cs exists in the intermediate section.

When the length from the outside edge to the centroid "J" of the main component phase in the cutting plane and the length "D" of the cross-sectional line satisfy the above condition, there is a tendency to obtain a dielectric ceramic composition having high specific permittivity and being reliable because the local maximum value of Cs exists in the intermediate section.

For example, $L_{1a}$ and $L_{2a}$ in FIG. 3A are respectively the length from the outside edge 241a to the centroid "J" of the main component phase in the cutting plane and the length from the outside edge 242a to the centroid "J" of the main component phase in the cutting plane. The $L_{1a}$ is within the range of the 40% to 70% of the length "D" of the cross-sectional line while the $L_{2a}$ does not satisfy the condition. Consequently, the $L_{1a}$ of FIG. 3A is preferable to have the local maximum value of Cs in the intermediate section, but the $L_{2a}$ is not required to have the local maximum value of Cs in the intermediate section.

Also, $L_{1b}$ and $L_{2b}$ in FIG. 3B are respectively the length from the outside edge 241b to the centroid "J" of the main component phase in the cutting plane and the length from the outside edge 242b to the centroid "J" of the main component phase in the cutting plane. The $L_{1b}$ and $L_{2b}$ of FIG. 3B are both included in the range of the 40% to 70% of the length "D" of the cross-sectional line. Consequently, it is preferable that both $L_{1b}$ and $L_{2b}$ of FIG. 3B have the local maximum value of Cs in the intermediate section.

As shown in FIG. 3A, the length between the outside edge 241a and the boundary 25a of the main component phase and the diffusive phase on the line segment from the outside edge 241a to the centroid "J" is preferably 10% to 40% of the length "D" of the cross-sectional line, more preferably 20 to 30% of the length "D" of the cross-sectional line, in the present embodiment.

When the length from the outside edge 241a to the boundary 25a satisfy the above condition, it is preferable that the local maximum value of Cs exists in the intermediate section. However, the local maximum value of Cs is not required to be in the intermediate section when the length between the outside edge 241a and the boundary portion 25a does not satisfy the above condition.

For example, in FIG. 3C, the length from the outside edge 241c to the boundary 251c exceeds 40%, so that Cs is not required to exist in the intermediate section in $L_{1c}$.

It is because, for example, the cutting plane of the dielectric particle may be far off the center of the main component phase, etc., that a rate of the main component phase in the cutting plane of the dielectric particle is remarkably reduced as in FIG. 3C.

Note that it is unnecessary that all dielectric particles constituting the dielectric ceramic composition show the concentration distribution of the subcomponent elements in the dielectric ceramic composition according to the present embodiment and a predetermined amount of the dielectric particles showing the above concentration distribution may exist in the dielectric ceramic composition.

For example, the total cross-sectional area of the dielectric particles having the above concentration distribution is preferably 50% or more, more preferably 70% or more, with respect to the total cross-sectional area of the dielectric particles observed in a particular viewing area of the cross-sectional view of the dielectric ceramic composition according to the present embodiment.

Note that as the particular viewing area in the present embodiment, for example, there may be mentioned a viewing area captured at a magnification of 50000 to 100000. Also, in the present embodiment, it is preferable to obtain an averaged value of measurements of five viewings.

Furthermore, in the present embodiment, as shown in FIG. 3A, the dielectric particle has concentration distribution such that the local minimal value of Cs is present at a side of the outside edge 241a compared to the above position of the local maximum value of Cs and that Cs is increased toward the outside edge 241a from the position of the local minimal value. Because of this, the load of voltage is dispersed near the grain boundary of the dielectric particle and the intermediate section "X". As a result, deterioration of the grain boundary can be inhibited to improve reliability.

In the present embodiment, it is preferable to have the local maximum value of Cs in the outside edge of the dielectric particle. Due to this, the load of voltage can be dispersed near the grain boundary of the dielectric particle and the intermediate section "X". As a result, deterioration of the grain boundary can be inhibited to improve reliability. Note that "to have the local maximum value of Cs in the outside edge of the dielectric particle" means the following state.

Figure 3D:
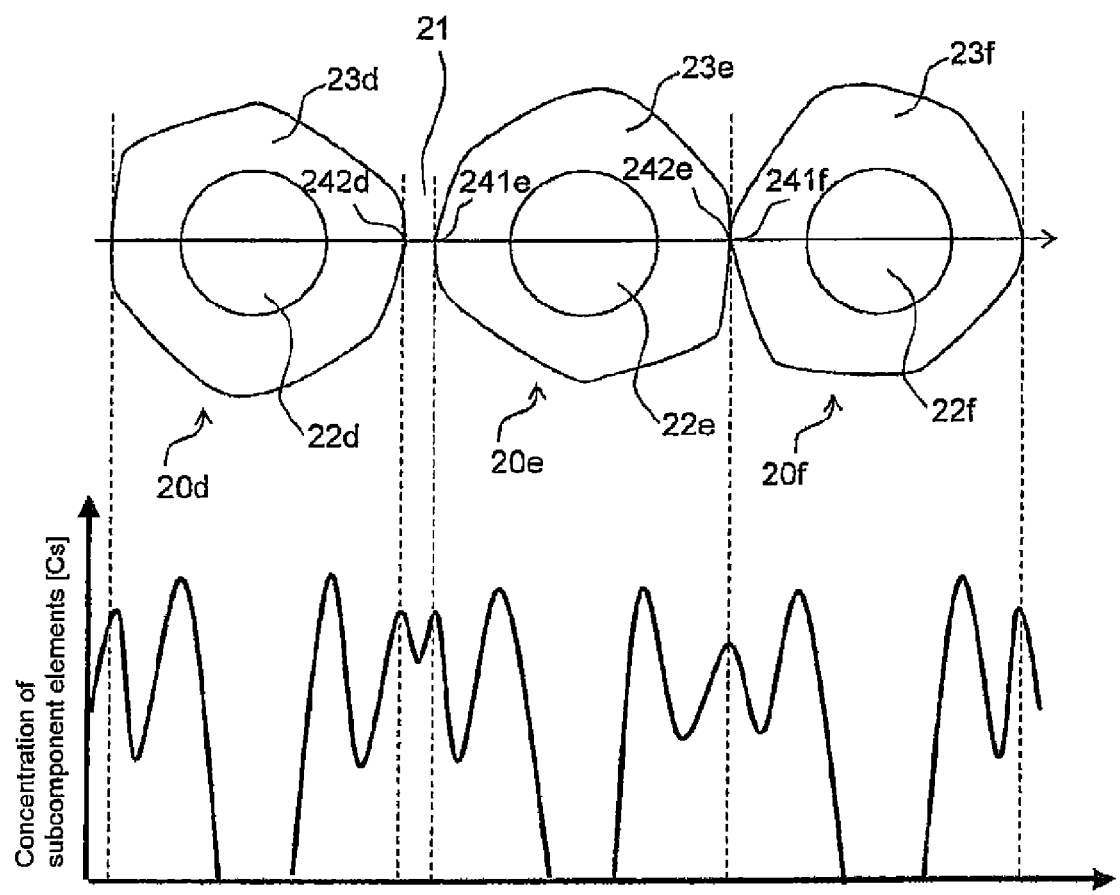
FIG. 3D is an enlarged cross-sectional view showing major parts of a dielectric layer 2 shown in FIG. 1, and a pattern diagram of concentration distribution of subcomponent elements in dielectric particles 20d, 20e and 20f constituting the dielectric layer 2 and in a grain boundary 21.

The condition such that each Cs of the outside edges 242d and 241e is higher than each Cs at the inside of the dielectric particles 20d and 20e, and is equivalent to or higher than Cs of its adjacent grain boundary is indicated as "having the local maximum value of Cs in the outside edge of the dielectric particle" when the grain boundary 21 is present between the dielectric particles as in the dielectric particles 20d and 20e in FIG. 3D. According to the pattern diagram of concentration distribution in FIG. 3D, Cs of the outside edge is higher than Cs of the grain boundary, but it is not necessarily required to be such a distribution "to have the local maximum value of Cs in the outside edge of the dielectric particle" in the present embodiment, and for example, Cs of the outside edge and Cs of its adjacent grain boundary may be equivalent.

When the dielectric particles have contact with each other and few grain boundaries are present as with the dielectric particles 20e and 20f in FIG. 3D, contact points of the dielectric particles are defined as the outside edges 242e and 241f of respective dielectric particles. Therefore, when Cs at the contact point of the dielectric particle is higher than each Cs at the inside of dielectric particles 20d and 20f, the condition can be regarded as "having the local maximum value of Cs in the outside edge of the dielectric particle".

Also, when the local maximum value of Cs in the intermediate section is defined as Csi and Cs in the outside edge is defined as Cso, Csi and Cso preferably satisfy the following relational expression (1). Note that the unit of Cs, "atom %" indicates a concentration of one or more elements selected from the subcomponent elements with respect to the total amount of elements excluding oxygen in an arbitrary position of the dielectric particle:

$$0 \text{ atom \%} < Csi - Cso \leq 1 \text{ atom \%} \quad (1)$$

By making the Csi and Cso satisfy the relational expression (1), high temperature accelerated lifetime tends to be good. This may be because the load of voltage can be dispersed in a balanced manner near the grain boundary of the dielectric particle and in the intermediate section "X" by making the Csi and Cso satisfy the relational expression (1).

Furthermore, when the local minimal value of Cs existing closer to the side of the outside edge 241a than the position of the above local maximum value of Cs is defined as Csm, "Csi–Csm" is preferably 0.6 to 2.6 atom %, more preferably 1.5 to 2.0 atom %. Also, "Cso–Csm" is preferably 0.7 to 0.9 atom %.

When "Cso–Csm" or "Csi–Csm" is within the above ranges, high temperature load life property tends to be good.

In the present embodiment, it is preferable that the above Cs is the total concentration of the rare-earth elements or Mg concentration in an arbitrary position in the dielectric particle. When the total concentration of the rare-earth elements in the dielectric particle shows the above concentration distribution, specific permittivity and high temperature accelerated lifetime tend to be improved. Also, when Mg in the dielectric particle shows the above concentration distribution, specific permittivity, high temperature accelerated lifetime and capacitance-temperature characteristic tend to be improved.

Also, in the present embodiment, it is preferable that the dielectric particle includes one or more rare-earth elements and Mg, and that total Cs of the one or more rare-earth elements and Cs of Mg both have the local maximum value in the intermediate section. Furthermore, it is preferable that a distance between the position of the local maximum value of the total Cs of the one or more rare-earth elements and the position of the local maximum value of Cs of Mg is a length of 5% or less with respect to the cross-sectional line D. When the position of the local maximum value of the total Cs of the one or more rare-earth elements and the position of the local maximum value of Cs of Mg are within the above range, reliability tends to be improved.

Grain size of the dielectric particle 20 of the present embodiment is not particularly limited, and is preferably 0.10 to 0.50 µm, more preferably 0.15 to 0.30 µm.

The grain size of the dielectric particle 20 can be, for example, measured as follows. Namely, the grain size can be obtained by cutting the device body 10 in stacking direction of the dielectric layer 2 and the internal electrode layer 3, measuring an average area of the dielectric particle in the cross-sectional surface to calculate the diameter as an equivalent circle diameter, and multiplying the obtained diameter by 1.27. Then, the grain size is measured for 200 or more dielectric particles, and based on the obtained cumulative frequency distribution of the grain size, the value having cumulative frequency of 50% may be defined as an average grain size (unit: µm). Note that the grain size may be determined depending on the thickness of the dielectric layer 2 and the like.

A method for discriminating the dielectric particle from the grain boundary in the dielectric ceramic composition, or a method for discriminating the main component phase from the diffusive phase is not particularly limited, and for example, the dielectric particle 20 can be discriminated from the grain boundary 21, or the main component phase 22 can be discriminated from the diffusive phase 23, by observing the dielectric layer 2 using a transmission electron microscope (TEM) or a scanning transmission electron microscope (STEM).

Specifically, the cross-sectional surface of the dielectric layer 2 is captured by STEM to obtain a bright field (BF) image. In this bright field image, the dielectric particle 20, and a region being present between the dielectric particles 20 and having different contrast from the dielectric particles as the grain boundary 21 are checked. Also, in the bright field image, the main component phase 22, and a region having different contrast from the main component phase as the diffusive phase 22 are checked inside the dielectric particle 20.

It may be done to estimate whether to have different contrast or not, either visually or by means of software and the like for image processing.

Also, a method for measuring Cs is not particularly limited, and it can be done by performing point analysis in the dielectric particle 20 by using an energy dispersive X-ray analyzer (EDS) that comes with STEM, and calculating a content rate of each element in the dielectric particle 20.

Specifically, point analysis is done by means of EDS for a region estimated as the dielectric particle 20. At this time, measuring conditions such as beam diameter, accelerating voltage, CL diaphragm and the like are maintained not to detect a region except for the dielectric particle, e.g. information of elements included in the grain boundary and the like. Note that the number of measuring points is not particularly limited, and is preferably 10 or more points per line segment from the centroid "J" of the main component phase to the outside edge.

In the bright field (BF) image obtained by shooting by TEM or STEM, the boundary of the main component phase and the diffusive phase confirmed by the difference in contrast has a tendency to correspond to the local maximum value of Cs in the intermediate section, but in some cases, the local maximum values of Cs in the boundary and the intermediate section may not be the same.

<Internal Electrode Layer 3>

Electrical conducting materials included in the internal electrode layer 3 are not particularly limited, and Ni or Ni alloy is preferable in the present embodiment. As the Ni alloy, an alloy of Ni with one or more elements selected from Mn, Cr, Co and Al is preferable, and Ni content in the alloy is preferably 95 wt % or more. Note that a variety of trace amount of components such as P may be included in about 0.1 wt % or less in the Ni or Ni alloy. The thickness of the internal electrode layer 3 may be properly determined depending on intended use and the like.

<External Electrode 4>

Electrical conducting materials included in the external electrode 4 are not particularly limited, and inexpensive Ni, Cu and alloys thereof can be used in the present invention. The thickness of the external electrode 4 may be properly determined depending on intended use and the like.

<Method for Manufacturing Multilayer Ceramic Capacitor 1>

The multilayer ceramic capacitor 1 having the dielectric ceramic composition of the present embodiment as a dielectric layer can be, as with a conventional multilayer ceramic capacitor, manufactured by producing a green chip by a normal method using paste such as printing method, sheet method and the like, followed by calcination thereof, and printing or transferring the external electrode followed by calcining the same. Hereinafter, the manufacturing method will be specifically explained, but a method for manufacturing the multilayer ceramic capacitor of the present embodiment is not limited to the following method.

First, dielectric materials for forming the dielectric layer are prepared and formed into a paste to obtain a dielectric layer paste.

For the dielectric materials, raw materials of $ABO_3$, raw materials of an oxide of Mg, raw materials of an oxide of rare-earth elements, and raw materials of Si containing oxide are prepared. As these raw materials, oxides of the above-mentioned components and mixture thereof, composite oxides can be used, and it is also possible to properly select to mix to use from a variety of compounds to become the above-mentioned oxides and composite oxides by calcination, e.g. carbonate, oxalate, nitrate, hydroxide, organic metal compound and the like.

Note that those produced by various methods such as a variety of liquid phase methods (e.g. oxalate method, hydrothermal synthesis method, alkoxide method, sol-gel method, etc.) in addition to so-called solid-phase method, etc. can be used as the raw materials of $ABO_3$.

Furthermore, when the dielectric layer includes components other than the above main component and subcomponents, oxides or mixture of these components, and composite oxides can be used as raw materials of the components, as with the above-mentioned components. Also, a variety of compounds to become the above-mentioned oxide or composite oxide by calcination can be used in addition to this.

Content of each compound in the dielectric materials may be determined so as to have the above-mentioned composition of the dielectric ceramic composition after calcination. In the state before forming a paste, particle diameter of the dielectric materials is normally 0.1 to 1 μm or so as an average particle diameter.

The dielectric layer paste may be organic paste obtained by kneading the dielectric materials and organic vehicle, or may be aqueous paste.

The organic vehicle is obtained by dissolving binder in an organic solvent. The binder is not particularly limited, and may be properly selected from a variety of normal binders such as ethyl cellulose and polyvinyl butyral. The organic solvent is also not particularly limited, and may be properly selected from a variety of organic solvents such as terpineol, butyl carbitol, acetone and toluene depending on the method used such as the printing method and sheet method.

Also, when aqueous paste is used as the dielectric layer paste, aqueous vehicle obtained by dissolving water-soluble binder, dispersant and the like in water may be kneaded with dielectric materials. The water-soluble binder is not particularly limited, and for example, polyvinyl alcohol, cellulose, water-soluble acrylic resin and the like may be used.

The internal electrode layer paste may be prepared by kneading electrical conducting materials composed of the above-mentioned Ni or Ni alloy, or a variety of oxides, organic metal compounds, resinates and the like, which become the above-mentioned Ni or Ni alloy after calcination, with the above-mentioned organic vehicle. Also, the internal electrode layer paste may include common materials. The common materials are not particularly limited, and preferably have the composition similar to the main component.

The external electrode paste may be prepared as with the above mentioned internal electrode layer paste.

Content of the above-mentioned organic vehicle in each paste is not particularly limited, and may be normal content, for example, 1 to 5 wt % or so for the binder and 10 to 50 wt % or so for the solvent. Also, an additive selected from a variety of dispersants, plasticizers, dielectrics and insulators may be included in each paste if necessary. Total content is preferably 10 wt % or less.

When using the printing method, the dielectric layer paste and the internal electrode layer paste are printed on a substrate such as PET, stacked and cut into a predetermined shape, followed by peeling off the substrate to obtain a green chip.

Also, when using the sheet method, a green sheet is formed by using the dielectric layer paste to print the internal electrode layer paste thereon, followed by stacking the same and cutting into a predetermined shape, so that a green chip is obtained.

Before calcination, the green chip is subject to binder removal treatment. For binder removal conditions, a temperature rising rate is preferably 5 to 300° C./hour, a holding temperature is preferably 180 to 400° C., and temperature holding time is preferably 0.5 to 24 hours. Also, an atmosphere in the binder removal treatment is air or reducing atmosphere.

After the binder removal, the green chip is calcined. In the present embodiment, the calcination process is composed of a first calcination process and a second calcination process. In the first calcination, a temperature rising rate is preferably 200° C./hour or more. The holding temperature at the first calcination is preferably 1100 to 1300° C., and the holding time is preferably 0.1 to 4 hours.

The atmosphere at the first calcination is preferably reducing atmosphere, and as atmosphere gas, for example, mixed gas of $N_2$ and $H_2$ can be humidified to use.

Also, oxygen partial pressure at the first calcination may properly be determined depending on the kind of the electrical conducting material in the internal electrode layer paste, and when base metal such as Ni and Ni alloy is used as the electrical conducting material, oxygen partial pressure in the atmosphere is preferably $1.0 \times 10^{-8}$ to $1.0 \times 10^{-2}$ Pa. A temperature decreasing rate is preferably 50° C./hour or more.

In the present embodiment, it is preferable to perform the second calcination process at lower temperature than the holding temperature at the first calcination and at low oxygen partial pressure to the device body after the first calcination.

Specifically in the second calcination, the holding temperature is preferably 1000 to 1200° C., the holding time is preferably 5 to 400 hours, the temperature rising rate is preferably 200° C./hour or more, and the temperature decreasing rate is 50° C./hour or more.

Also, the atmosphere at the second calcination is preferably reducing atmosphere, and as the atmosphere gas, for example, mixed gas of $N_2$ and $H_2$ can be humidified to use. The oxygen partial pressure at the second calcination is preferably $10^{40}$ to $10^{-7}$ Pa.

In the present embodiment, it is preferable to perform oxidation treatment to the device body after the second calcination. Specifically in the oxidation treatment, the holding temperature is preferably 650 to 1100° C., and the holding time is preferably 0.5 to 9 hours. Also, the atmosphere at the oxidation treatment is preferably humidified $N_2$ gas (oxygen partial pressure: $1.0 \times 10^{-3}$ to 1.0 Pa).

In the above-mentioned binder removal treatment, the calcination (the first calcination and the second calcination) and the oxidation treatment, for example, a wetter and the like may be used for humidifying $N_2$ gas, mixed gas and the like. In this case, water temperature is preferably 5 to 75° C. or so.

The binder removal treatment, the calcination (the first calcination and the second calcination) and the oxidation treatment may be done continuously or independently.

By controlling the calcination conditions and oxidation treatment conditions as above, the content rate of each element in the grain boundary, the thickness of the grain boundary, the state of the segregating region can be made as desired. As a result, it is possible to obtain a multilayer type ceramic electronic component showing good dielectric properties regardless of contents of oxides of Mg, Si, R and the like in the dielectric ceramic composition.

The capacitor device body obtained as above is subject to, for example, end surface polishing by barrel polishing, sandblast and the like, and the external electrode paste is applied thereon followed by calcination, so that an external electrode 4 is formed, Then, as needed, a covering layer is formed by plating, etc. on the surface of the external electrode 4 to obtain a multilayer ceramic capacitor. The obtained multilayer ceramic capacitor is mounted on a printed substrate and the like by soldering, etc., and is used in a variety of electronic devices and the like.

Thus-manufactured dielectric layer of the multilayer ceramic capacitor of the present embodiment can be constituted by the dielectric ceramic composition according to the present embodiment, and specifically, the subcomponent elements in the dielectric particle have a predetermined concentration distribution.

Note that a method for making the concentration distribution of the subcomponent elements in the dielectric particle into a predetermined distribution is not limited to the above method, and for example, it is possible to obtain by adjusting an amount added of the subcomponents. However, for adjusting the amount added of the subcomponents, such adjustment may cause to influence various properties, so that it is preferable to control by calcination conditions as shown in the present embodiment.

Thus, the embodiment of the present invention has been explained, but the present invention is not limited to the above-mentioned embodiment, and can be variously modified within the scope of the present invention.

In the above embodiment, a multilayer ceramic capacitor is exemplified as a multilayer type ceramic electronic component according to the present invention, but a multilayer type ceramic electronic component according to the present invention is not limited to such a multilayer ceramic capacitor, and may be any electronic component having the above constitution.

EXAMPLES

Hereinafter, the present invention will be explained based on further detailed examples, but the present invention is not limited to the examples.

<Samples 1 to 7 & 8 to 26>

First, $BaTiO_3$ powder was prepared as raw materials of $ABO_3$, i.e. the main component. Also, as raw materials of the subcomponents, $MgCO_3$ powder for raw materials of an oxide of Mg, $Dy_2O_3$ powder and $Y_2O_3$ powder for raw materials of oxides of rare-earth elements, $(Ba_{0.6}Ca_{0.4})$ $SiO_3$ (hereinafter may also be referred to as BCG) powder for raw materials of Si containing oxide, MnO powder for raw materials of an oxide of Mn and $V_2O_5$ powder for raw materials of an oxide of V were prepared respectively. Note that $MgCO_3$ came to be included as MgO in a dielectric ceramic composition after calcination.

Next, the above-prepared $BaTiO_3$ powder (average particle diameter: 0.15 μm) and raw materials of the subcomponents were wet pulverized by ball mill for 15 hours, and dried to obtain dielectric materials. Note that an added amount of each subcomponent was determined such that the dielectric ceramic composition after calcination contained 2.0 moles of MgO, 0.5 mole of $Dy_2O_3$, 0.5 mole of $Y_2O_3$, 0.9 mole of BCG, 0.1 mole of MnO, and 0.1 mole of $V_2O_5$, in terms of each oxide, per 100 moles of the main component, $BaTiO_3$.

Then, 100 parts by weight of the obtained dielectric materials, 10 parts by weight of polyvinyl butyral resin, 5 parts by weight of dioctyl phthalate (DOP) as a plasticizer and 100 parts by weight of alcohol as a solvent were mixed by a ball mill and formed into a paste to obtain a dielectric layer paste.

Also, separately, 44.6 parts by weight of Ni powder, 52 parts by weight of terpineol, 3 parts by weight of ethyl cellulose and 0.4 part by weight of benzotriazole were kneaded by three-roller, and formed into a slurry to prepare an internal electrode layer paste.

Then, by using the above-prepared dielectric layer paste, a green sheet was formed on a PET film. Next, by using the internal electrode layer paste, an electrode layer was printed thereon in a predetermined pattern, followed by peel-off of the sheet from the PET film, so that a green sheet having an electrode layer was prepared. Then, a plurality of the green sheets having an electrode layer was stacked, pressure was applied thereto to bond to obtain a green stacking body, and the green stacking body was cut into a predetermined size, so that a green chip was obtained.

Next, the obtained green chip was subject to binder removal treatment, calcination (the first calcination and the second calcination) and oxidation treatment under the following conditions to obtain a device body as a sintered body.

The binder removal treatment conditions included temperature rising rate: 15° C./hour, holding temperature: 280° C., temperature holding time: 8 hours, and atmosphere: in the air.

The first calcination conditions included temperature rising rate: 200 to 2000° C./hour, holding time: 0.5 to 2 hours, temperature decreasing rate: 200 to 2000° C./hour, and atmosphere gas: humidified mixed gas of $N_2+H_2$. The oxygen partial pressure of atmosphere gas and holding temperature were as shown in Tables 1 to 4.

The second calcination conditions included temperature rising rate: 200° C./hour, holding time: 200 hours, temperature decreasing rate: 200° C./hour, and atmosphere gas: humidified gas of $N_2+H_2$. The oxygen partial pressure of atmosphere gas and holding temperature were as shown in Tables 1 to 4.

The oxidation treatment conditions included temperature rising rate: 200° C./hour, holding time: 2 hours, temperature decreasing rate: 200° C./hour, and atmosphere gas: humidified $N_2$ gas. The oxygen partial pressure of atmosphere gas and holding temperature were as shown in Tables 1 to 4.

Note that a wetter was used for humidifying the atmosphere gas in the calcination and oxidation treatment.

Then, after an end surface of the obtained device body was polished by sandblast, Cu was applied as an external electrode, and a sample of a multilayer ceramic capacitor shown in FIG. 1 was obtained. The size of the obtained capacitor sample was 1.0 mm×0.5 mm×0.5 mm, the thickness of the dielectric layer was 1.0 μl, and the thickness of the internal electrode layer was 1.0 μm. Also, the number of the dielectric layers sandwiched by the internal electrode layers was 200.

As for the sample 7a, except for not performing the second calcination, and applying the following conditions of the binder removal treatment, first calcination and oxidation treatment, a capacitor sample was obtained as with samples 1 to 7 and 8 to 26. Note that the holding temperatures and the oxygen partial pressure of atmosphere gas in the first calcination and the re-oxidation treatment were shown in Table 1.

Binder Removal Treatment Conditions:
temperature rising rate: 25° C./hour
holding temperature: 260° C.
temperature holding time: 8 hours
atmosphere: in the air
First Calcination Conditions:
temperature rising rate:
　200° C./hour (to 800° C.)
　300° C./hour (800 to 1000° C.)
　400° C./hour (1000° C. to holding temperature)
temperature decreasing rate: same as the temperature rising rate
atmosphere gas: humidified mixed gas of $N_2+H_2$
Re-oxidation Treatment Conditions
temperature rising rate: 200° C./hour
temperature holding time: 2 hours
temperature decreasing rate: 200° C./hour
atmosphere gas: humidified $N_2$ gas As for the sample 7b, except for not performing the second calcination, and applying the following conditions of the binder removal treatment, first calcination and oxidation treatment, a capacitor sample was obtained as with samples 1 to 7 and 8 to 14. Note that the holding temperature and the oxygen partial pressure of atmosphere gas in the first calcination and the re-oxidation treatment were shown in Table 1.

Binder Removal Treatment Conditions:
temperature rising rate: 20° C./hour
holding temperature: 300° C.
temperature holding time: 8 hours
atmosphere: in the air
First Calcination Conditions:
temperature rising rate: 500° C./hour
holding time: 0.5 hour
atmosphere gas: humidified $N_2+H_2$ mixed gas
Re-oxidation Treatment Conditions:
temperature rising rate: 300° C./hour
temperature holding time: 2 hours
temperature decreasing rate: 300° C./hour
atmosphere gas: humidified $N_2$ gas For the samples 1 to 7, 7a, 7b and 15 to 20 in the obtained capacitor sample, concentration distribution of the rare-earth elements in the dielectric particle, high temperature accelerated lifetime and specific permittivity were measured by the following methods respectively. Also, for the samples 8 to 14 and 21 to 26, concentration distribution of Mg in the dielectric particle, capacitance temperature change rate and specific permittivity were measured by the following methods respectively.

<Concentration Distribution of Rare-Earth Elements or Mg in Dielectric Particle>

Figure 6:
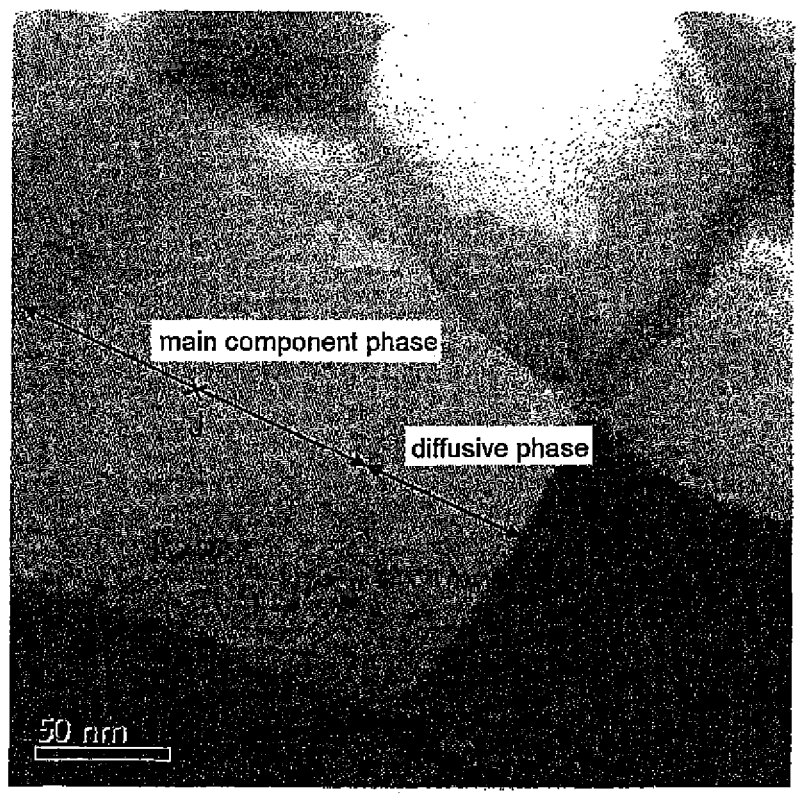
FIG. 6 is a STEM picture of dielectric particles of an example of the present invention.

The capacitor sample was cut in a plane perpendicular to the dielectric layer. This cutting plane was subject to STEM observation to discriminate the dielectric particle from the grain boundary and to discriminate the main component phase from the diffusive phase, and the length "D" of an arbitrary cross-sectional line was then obtained to determine the intermediate section (a section between the position of 10% of the length "D" of the cross-sectional line from the outside edge, and the position of 30% of the length "D" of the cross-sectional line from the outside edge). Note that FIG. 6 is a STEM picture of the sample 6.

Next, a line segment from an arbitrary outside edge of an arbitrary dielectric particle in the cutting plane of each sample to the centroid of the main component phase in the above cutting plane was subject to point analysis. Specifically, 13 point analyses were done per one line segment using EDS device that came with STEM. 13 points corresponded to the position of 0%, 4%, 8%, 12%, 16%, 20%, 24%, 28%, 32%, 36%, 40%, 44% and 50%, expressed by the following formula (2):

$$[(\text{length from outside edge to measuring point})/(\text{length "D" of cross-sectional line})] \times 100[\%] \quad (2)$$

The characteristic X-ray obtained by measurements was subject to quantitative analysis, and Cs (concentration [atom %] of the rare-earth elements or Mg) in each measuring point was calculated. The concentration of the rare-earth elements in the present example was a total concentration of Dy and Y.

As mentioned above, the distribution of Cs was measured for each sample, and the length of the line segment from the outside edge to the centroid of the main component phase in the cutting plane was 40% to 70% of the length "D" of the cross-sectional line in every sample. Also, the length from the outside edge to a boundary portion between the main component phase and the diffusive phase on the line segment from the outside edge to the centroid of the main component phase in the cutting plane was 10 to 40% of the length "D" of the cross-sectional line.

Next, the concentration of rare-earth elements and the position of the measuring point expressed by the following formula (2) were plotted as a longitudinal axis and a horizontal axis, respectively, and the concentration distribution of the rare-earth elements was checked.

$$[(\text{length from outside edge to measuring point})/(\text{length "D" of cross-sectional line})] \times 100 [\%] \quad (2)$$

Figure 7:
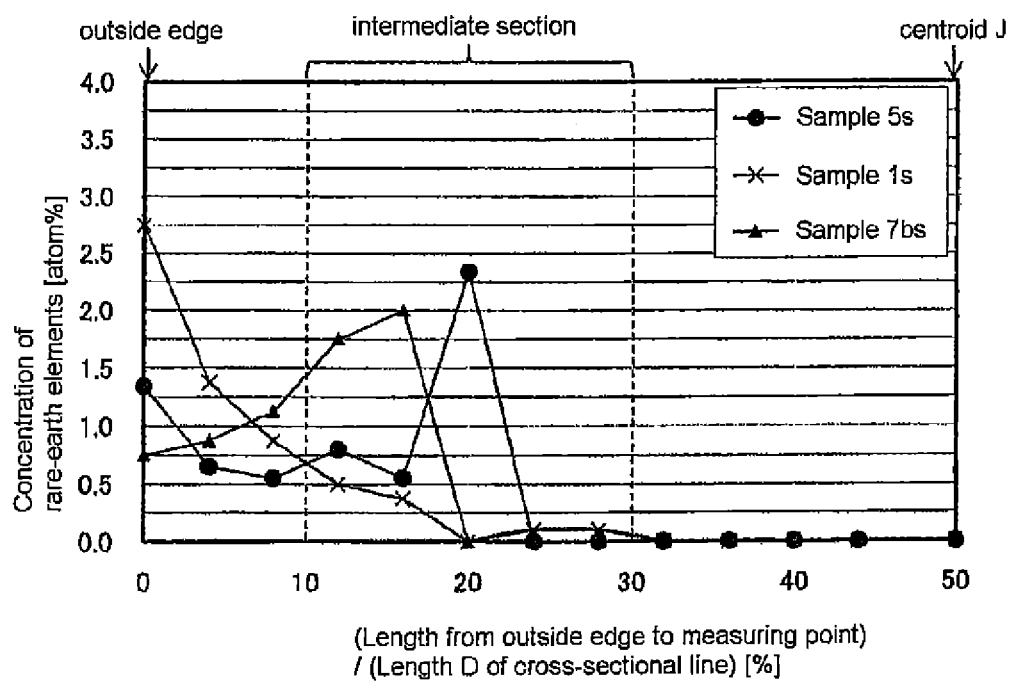
FIG. 7 is a graph showing a relationship between a concentration of rare-earth element in the dielectric particle in the example of the present invention and a measuring point.

Table 5 shows a relation of the concentration of the rare-earth elements and measuring points in the dielectric particle in samples 1s, 5s and 7bs, and FIG. 7 was a graph based on Table 5.

As for the samples 1 to 7, 7a, 7b and 8 to 14, the following points were checked. First, it was checked whether the maximum value of Cs in a section of less than 5% of the length "D" of the cross-sectional line from the outside edge was present in the outside edge. Also, it was checked whether the local maximum value of Cs was appeared in the position of 5% or more to 50% or less of the length "D" of the cross-sectional line from the outside edge or not, and if present, the position was checked. The results are shown in Tables 1 and 2.

As for the samples 15 to 26, Cs (Cso) in the outside edge and the local minimal value (Csm) existing closer to the side of the outside edge than the local maximum value of Cs in the intermediate section and the local maximum value (Csi) of Cs in the intermediate section were measured to calculate (Csi−Cso), (Csi−Csm) and (Cso−Csm). The results are shown in Table 3 and Table 4. Note that the maximum value of Cs in a section of less than 5% of the length "D" of the cross-sectional line from the outside edge was present in the outside edge in any of the samples 15 to 26.

<High Temperature Accelerated Lifetime (HALT)>

The capacitor sample was held in the state that a direct voltage was applied at 180° C. under an electric field of 6V/μm, and time-dependent change in insulation resistance (IR) was measured, by which high temperature accelerated lifetime was evaluated. In the present examples, time from the start of applying pressure until insulation resistance was dropped by 1 digit was measured for 20 capacitor samples to obtain its average value. In the present examples, 20 hours or more was evaluated as being good, 40 hours or more was evaluated as being better. The results are shown in Table 1, Table 3 and Table 4.

<Specific Permittivity ∈>

The specific permittivity ∈ (no unit) was calculated based on capacitance measured in the capacitor sample at reference temperature of 25° C. with a digital LCR meter (4274A manufactured by YHP), under the condition of frequency of 1 kHz and level of input signal (measured voltage) of 0.5 Vrms. The specific permittivity is preferably higher, and in the present examples, 3000 or more was evaluated as being good. The results are shown in Table 1 and Table 2.

<Temperature Property of Capacitance>

The capacitor sample was subject to measurement of capacitance at reference temperature of 25° C. with a digital LCR meter (4274A manufactured by YHP), under the condition of frequency of 1 kHz and level of input signal (measured voltage) of 0.5 Vrms, followed by measurement of capacitance at 85° C. to calculate a change rate ΔC of capacitance with respect to the capacitance at 25° C. In the present examples, the change rate ΔC within the range of ±15% was evaluated as being good. Namely, those satisfying X5R property was evaluated as being good. The results are shown in Table 2.

TABLE 1

| | | First calcining | | Second calcining | | Oxidation treatment | | Maximum value of Cs is present in the outside edge in a section of less than 5% of length D of cross-sectional line from the outside edge. | Position of the local maximum value of Cs found in a position of 5% or more of length D of cross-sectional line from the outside edge [%] | High temperature accelerated lifetime (HALT) [h] | Specific permittivity (ε) [—] |
|---|---|---|---|---|---|---|---|---|---|---|---|
| | Sample No. | $O_2$ partial pressure [Pa] | holding temp. [° C.] | $O_2$ partial pressure [Pa] | holding temp. [° C.] | $O_2$ partial pressure [Pa] | holding temp. [° C.] | | | | |
| Comp. Ex | 1 | $1.0 \times 10^{-4}$ | 1200 | $1.0 \times 10^{-5}$ | 1075 | $1.0 \times 10^{-1}$ | 950 | Yes | None | 3 | 3950 |
| Comp. Ex | 2 | $1.0 \times 10^{-4}$ | 1200 | $1.0 \times 10^{-5}$ | 1075 | $1.0 \times 10^{-1}$ | 950 | Yes | None | 4 | 3900 |
| Comp. Ex | 3 | $1.0 \times 10^{-5}$ | 1200 | $1.0 \times 10^{-7}$ | 1075 | $1.0 \times 10^{-1}$ | 950 | Yes | 5 | 15 | 3700 |
| Example | 4 | $1.0 \times 10^{-5}$ | 1200 | $1.0 \times 10^{-7}$ | 1075 | $1.0 \times 10^{-1}$ | 950 | Yes | 10 | 35 | 3490 |
| Example | 5 | $1.0 \times 10^{-5}$ | 1200 | $1.0 \times 10^{-8}$ | 1075 | $1.0 \times 10^{-1}$ | 950 | Yes | 20 | 50 | 3350 |
| Example | 6 | $1.0 \times 10^{-6}$ | 1200 | $1.0 \times 10^{-8}$ | 1075 | $1.0 \times 10^{-1}$ | 950 | Yes | 30 | 44 | 3080 |
| Comp. Ex | 7 | $1.0 \times 10^{-7}$ | 1200 | $1.0 \times 10^{-8}$ | 1075 | $1.0 \times 10^{-1}$ | 950 | Yes | 35 | 40 | 2750 |
| Comp. Ex | 7a | $1.0 \times 10^{-6}$ | 1200 | | | $1.0 \times 10^{-1}$ | 1000 | No | 5 | 10 | 3750 |
| Comp. Ex | 7b | $1.0 \times 10^{-6}$ | 1200 | | | $1.0 \times 10^{-1}$ | 1000 | No | 15 | 18 | 3390 |

* Cs is a total concentration of rare-earth elements in an arbitrary position in the dielectric particle.

TABLE 2

| | | First calcining | | Second calcining | | Oxidation treatment | | Maximum value of Cs is present in the outside edge in a section of less than 5% of length D of cross-sectional line from the outside edge. | Position of the local maximum value of Cs found in a position of 5% or more of length D of cross-sectional line from the outside edge [%] | Capacitance temperature change rate | Specific permittivity (ε) [—] |
|---|---|---|---|---|---|---|---|---|---|---|---|
| | Sample No. | $O_2$ partial pressure [Pa] | holding temp. [° C.] | $O_2$ partial pressure [Pa] | holding temp. [° C.] | $O_2$ partial pressure [Pa] | holding temp. [° C.] | | | | |
| Comp. Ex | 8 | $1.0 \times 10^{-4}$ | 1200 | $1.0 \times 10^{-5}$ | 1075 | $1.0 \times 10^{-1}$ | 950 | Yes | None | −22.0% | 4060 |
| Comp. Ex | 9 | $1.0 \times 10^{-4}$ | 1200 | $1.0 \times 10^{-5}$ | 1075 | $1.0 \times 10^{-1}$ | 950 | Yes | None | −20.0% | 3940 |
| Comp. Ex | 10 | $1.0 \times 10^{-5}$ | 1200 | $1.0 \times 10^{-7}$ | 1075 | $1.0 \times 10^{-1}$ | 950 | Yes | 5 | −16.5% | 3750 |
| Example | 11 | $1.0 \times 10^{-5}$ | 1200 | $1.0 \times 10^{-7}$ | 1075 | $1.0 \times 10^{-1}$ | 950 | Yes | 10 | −14.5% | 3440 |
| Example | 12 | $1.0 \times 10^{-5}$ | 1200 | $1.0 \times 10^{-8}$ | 1075 | $1.0 \times 10^{-1}$ | 950 | Yes | 20 | −13.5% | 3260 |
| Example | 13 | $1.0 \times 10^{-6}$ | 1200 | $1.0 \times 10^{-8}$ | 1075 | $1.0 \times 10^{-1}$ | 950 | Yes | 30 | −13.0% | 3100 |
| Comp. Ex | 14 | $1.0 \times 10^{-7}$ | 1200 | $1.0 \times 10^{-8}$ | 1075 | $1.0 \times 10^{-1}$ | 950 | Yes | 35 | −10.0% | 2880 |

* Cs is a concentration of Mg in an arbitrary position in the dielectric particle.

TABLE 3

| | Sample No. | First calcining | | Second calcining | | Oxidation treatment | | Cs(Cso) in the outside edge [atom %] |
|---|---|---|---|---|---|---|---|---|
| | | $O_2$ partial pressure [Pa] | holding temp. [° C.] | $O_2$ partial pressure [Pa] | holding temp. [° C.] | $O_2$ partial pressure [Pa] | holding temp. [° C.] | |
| Ref. Ex | 15 | $1.0 \times 10^{-6}$ | 1200 | $1.0 \times 10^{-8}$ | 1050 | $1.0 \times 10^{-1}$ | 950 | 1.3 |
| Example | 16 | $1.0 \times 10^{-6}$ | 1200 | $1.0 \times 10^{-8}$ | 1050 | $1.0 \times 10^{-1}$ | 950 | 1.3 |
| Example | 17 | $1.0 \times 10^{-6}$ | 1200 | $1.0 \times 10^{-8}$ | 1075 | $1.0 \times 10^{-1}$ | 950 | 1.3 |
| Example | 18 | $1.0 \times 10^{-5}$ | 1200 | $1.0 \times 10^{-8}$ | 1075 | $1.0 \times 10^{-1}$ | 950 | 1.3 |
| Example | 19 | $1.0 \times 10^{-7}$ | 1200 | $1.0 \times 10^{-8}$ | 1100 | $1.0 \times 10^{-1}$ | 950 | 1.3 |
| Ref. Ex | 20 | $1.0 \times 10^{-7}$ | 1200 | $1.0 \times 10^{-8}$ | 1125 | $1.0 \times 10^{-1}$ | 950 | 1.3 |

| | Local minimal value of Cs in the intermediate section closer to the outside edge than the local maximum value of Cs [atom %] | Local maximum value of Cs in the intermediate section (Csi) [atom %] | Csi − Cso | Csi − Csm | Cso − Csm | High temperature accelerated lifetime (HALT) [h] |
|---|---|---|---|---|---|---|
| Ref. Ex | 0.7 | 0.8 | −0.5 | 0.1 | 0.6 | 30 |
| Example | 0.6 | 1.2 | −0.1 | 0.6 | 0.7 | 40 |
| Example | 0.5 | 2.0 | 0.7 | 1.5 | 0.8 | 53 |
| Example | 0.5 | 2.5 | 1.2 | 2.0 | 0.8 | 58 |
| Example | 0.4 | 3.0 | 1.7 | 2.6 | 0.9 | 45 |
| Ref. Ex | 0.2 | 4.0 | 2.7 | 3.8 | 1.1 | 28 |

* Cs is a total concentration of rare-earth elements in an arbitrary position in the dielectric particle.

TABLE 4

| | Sample No. | First calcining | | Second calcining | | Oxidation treatment | | Cs(Cso) in the outside edge [atom %] |
|---|---|---|---|---|---|---|---|---|
| | | $O_2$ partial pressure [Pa] | holding temp. [° C.] | $O_2$ partial pressure [Pa] | holding temp. [° C.] | $O_2$ partial pressure [Pa] | holding temp. [° C.] | |
| Ref. Ex | 21 | $1.0 \times 10^{-6}$ | 1200 | $1.0 \times 10^{-8}$ | 1075 | $1.0 \times 10^{-1}$ | 1050 | 1.0 |
| Example | 22 | $1.0 \times 10^{-6}$ | 1200 | $1.0 \times 10^{-8}$ | 1075 | $1.0 \times 10^{-1}$ | 1050 | 1.0 |
| Example | 23 | $1.0 \times 10^{-6}$ | 1200 | $1.0 \times 10^{-8}$ | 1075 | $1.0 \times 10^{-1}$ | 900 | 1.0 |
| Example | 24 | $1.0 \times 10^{-6}$ | 1200 | $1.0 \times 10^{-8}$ | 1075 | $1.0 \times 10^{-2}$ | 900 | 1.0 |
| Example | 25 | $1.0 \times 10^{-6}$ | 1200 | $1.0 \times 10^{-8}$ | 1100 | $1.0 \times 10^{-3}$ | 800 | 1.0 |
| Ref. Ex | 26 | $1.0 \times 10^{-6}$ | 1200 | $1.0 \times 10^{-8}$ | 1100 | $1.0 \times 10^{-3}$ | 800 | 1.0 |

| | Local minimal value of Cs in the intermediate section closer to the outside edge than the local maximum value of Cs [atom %] | Local maximum value of Cs in the intermediate section (Csi) [atom %] | Csi − Cso | Csi − Csm | Cso − Csm | High temperature accelerated lifetime (HALT) [h] |
|---|---|---|---|---|---|---|
| Ref. Ex | 0.1 | 0.3 | −0.7 | 0.2 | 0.9 | 32 |
| Example | 0.3 | 1.0 | 0.0 | 0.7 | 0.7 | 48 |
| Example | 0.3 | 1.7 | 0.7 | 1.4 | 0.7 | 58 |
| Example | 0.5 | 2.5 | 1.5 | 2.0 | 0.5 | 64 |
| Example | 0.3 | 3.3 | 2.3 | 3.0 | 0.7 | 49 |
| Ref. Ex | 0.1 | 3.7 | 2.7 | 3.6 | 0.9 | 30 |

* Cs is a concentration of Mg in an arbitrary position in the dielectric particle.

TABLE 5

| | | Depth from length D of cross-sectional line outer circumference [%] | | | | | | | | | | | | | |
|---|---|---|---|---|---|---|---|---|---|---|---|---|---|---|---|
| | | 0 | 4 | 8 | 12 | 16 | 20 | 24 | 28 | 32 | 36 | 40 | 44 | 50 | SUM |
| R element concentration [atom %] | Sample 5s | 1.3 | 0.7 | 0.6 | 0.8 | 0.6 | 2.3 | 0.0 | 0.0 | 0.0 | 0.0 | 0.0 | 0.0 | 0.0 | 6.23 |
| | Sample 1s | 2.8 | 1.4 | 0.9 | 0.5 | 0.4 | 0.0 | 0.1 | 0.1 | 0.0 | 0.0 | 0.0 | 0.0 | 0.0 | 6.08 |
| | Sample 7bs | 0.8 | 0.9 | 1.1 | 1.8 | 2.0 | 0.0 | 0.0 | 0.0 | 0.0 | 0.0 | 0.0 | 0.0 | 0.0 | 6.50 |

From Table 1, it was confirmed that high temperature accelerated lifetime was low in the case the local maximum value of Cs was present in the intermediate section (samples 4 to 6), compared to those not having the local maximum value of Cs in the intermediate section (samples 1 & 2), or those having the local maximum value of Cs in outside edge side rather than in intermediate section (samples 3 &7a).

Figure 4:
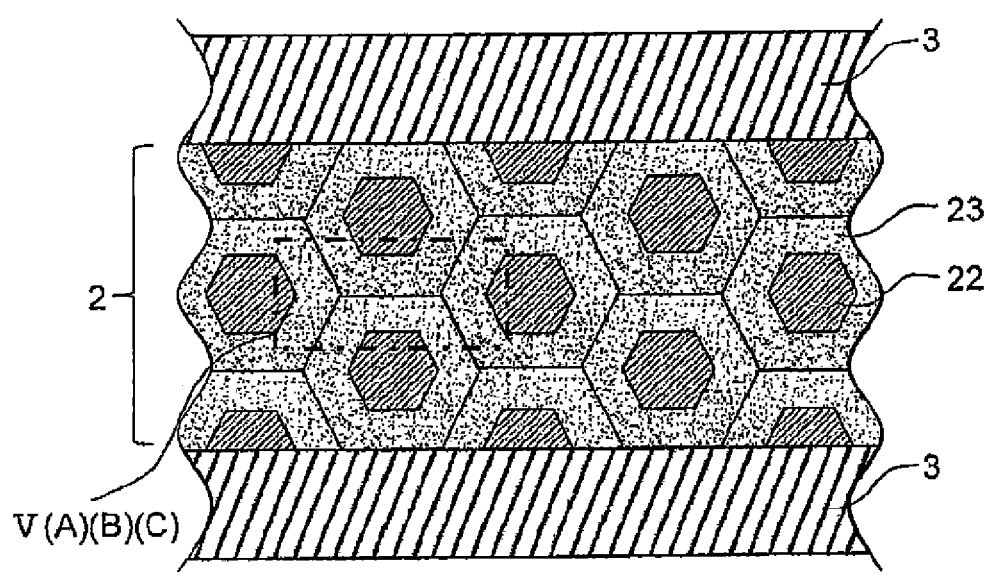
FIG. 4 is a conceptual diagram for explaining the structure of the dielectric layer 2 shown in FIG. 1.

FIG. 4 is a conceptual diagram for explaining the structure of the dielectric layer 2 shown in FIG. 1. Also, FIG. 5 (A), FIG. 5 (B) and FIG. 5 (C) are enlarged cross-sectional views of V portion in FIG. 4.

Figure 5:
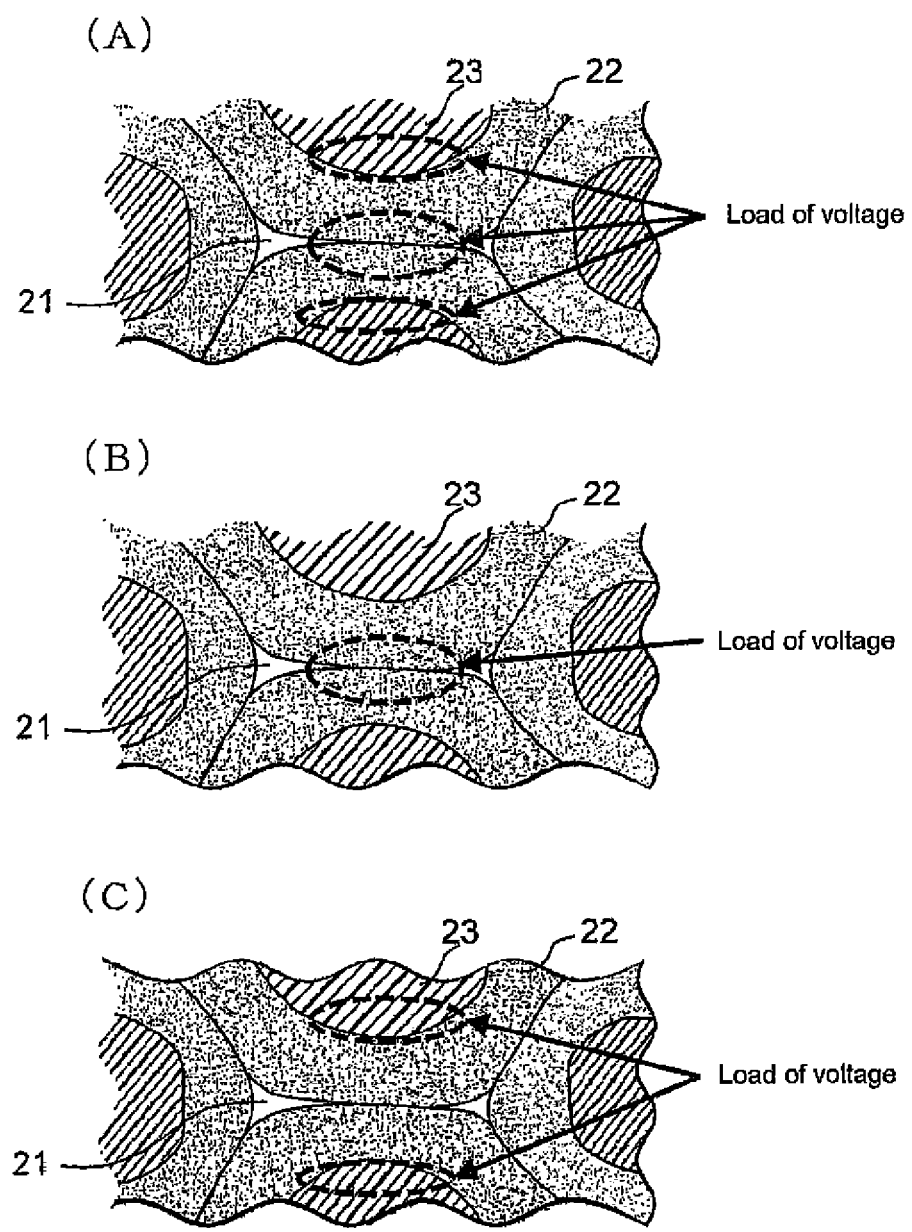
FIG. 5 (A) is an enlarged cross-sectional view of a V portion in FIG. 4, FIG. 5 (B) is an enlarged cross-sectional view of the V portion in FIG. 4, and FIG. 5 (C) is an enlarged cross-sectional view of the V portion in FIG. 4.

Since the local maximum value of Cs was present in the intermediate section in the samples 4 to 6, load of voltage was dispersed in the intermediate section and the outside edge as shown in FIG. 5 (A), which might result in inhibiting reduction in high temperature load life. On the other hand, since the local maximum value of Cs was not present in intermediate section in samples 1 to 3, load of voltage was concentrated in the outside edge as shown in FIG. 5 (B), which might result in reducing high temperature load life. Also, since there was no high region of Cs either in the outside edge or in the intermediate section in sample 7a, load of voltage was concentrated in between the outside edge and the intermediate section, which might result in reducing high temperature load life.

From Table 1, it was confirmed that specific permittivity was high in the case the local maximum value of Cs was present in the intermediate section (samples 4 to 6), compared to those having the local maximum value of Cs in the center side rather than in the intermediate section (sample 7).

Since the sample 7 had the local maximum value of Cs in the center side rather than in the intermediate section, an area of the main component phase was decreased, which might result in lowering specific permittivity.

From Table 1, it was confirmed that high temperature load life was lowered in the case the maximum value of Cs in a section which was less than 5% of the length "D" of the cross-sectional line from the outside edge was not present in the outside edge even when the local maximum value of Cs was in the intermediate section (sample 7b). This was because load of voltage was concentrated in the intermediate section as shown in FIG. 5 (C) since Cs in the outside edge was low, which might result in easily deteriorating the grain boundary.

From Table 2, it was confirmed that capacitance temperature change rate became better in the case the local maximum value of Cs was present in the intermediate section (samples 11 to 13) compared to those having no local maximum value of Cs (samples 8 & 9) or having the local maximum value of Cs closer to the outside edge than the intermediate section (sample 10).

Since the local maximum value of Cs was present in the intermediate section in the samples 11 to 13, load of voltage was dispersed in the intermediate section and the outside edge, as shown in FIG. 5 (A), which might result in improving the capacitance temperature change rate.

From Table 2, it was confirmed that specific permittivity was high in the case that the local maximum value of Cs was present in the intermediate section (samples 11 to 13), compared to those having the local maximum value of Cs in the center side rather than in the intermediate section (sample 14).

Because the sample 14 had the local maximum value of Cs in the center side rather than in the intermediate section, an area of the main component phase was decreased, which might result in lowering specific permittivity.

From Table 3, it was confirmed that high temperature load life was higher when the local maximum value (Csi) of Cs in the intermediate section and the local maximum value (Cso) of Cs in the outside edge satisfy the relation of 0 atom %<Csi−Cso≤1 atom % (samples 16 to 19), compared to those not satisfying the above relation (samples 15 and 20).

This may be because the load of voltage could be dispersed into the outside edge and the intermediate section by making the Csi and Cso satisfy the above relation, allowing preventing concentration of the load of voltage.

From Table 4, it was confirmed that high temperature load life was higher when the local maximum value (Csi) of Cs in the intermediate section and the local maximum value (Cso) of Cs in the outside edge satisfy the relation of 0 atom %<Csi−Cso≤1 atom % (samples 22 to 25), compared to those not satisfying the above relation (samples 21 and 26).

This may be because the load of voltage could be dispersed into the outside edge and the intermediate section by making the Csi and Cso satisfy the above relation, allowing preventing concentration of the load of voltage.

What is claimed is:

1. A dielectric ceramic composition comprising:
   a main component having a perovskite-type crystal structure represented by a general formula $ABO_3$, and
   at least one or more subcomponent elements,
   wherein:
   said dielectric ceramic composition has a dielectric particle and a grain boundary,
   said dielectric particle has a main component phase substantially composed of said main component, and a diffusive phase around said main component phase in which at least one selected from said subcomponent elements is diffused,
   when said dielectric particle is cut on an arbitrary cutting plane including said main component phase:
     a first local maximum value of Cs exists in an intermediate section that is between a position corresponding to a length of 10% of a length "D" of a cross-sectional line from an outside edge of the particle and a position corresponding to a length of 30% of the length "D" of said cross-sectional line from said outside edge,
     a local minimal value of Cs is located at a side of the outside edge with respect to a position of said first local maximum value of Cs, and Cs is increased from a position of said local minimal value of Cs toward said outside edge, and
     a second local maximum value of Cs exists in the outside edge of said dielectric particle,
   Cs is defined as a concentration of one or more elements selected from said subcomponent elements in an arbitrary position in said dielectric particle, and
   "D" is defined as a length of a cross-sectional line from an arbitrary outside edge of the dielectric particle in said cutting plane passing through a centroid of the main component phase in said cutting plane to a facing arbitrary outside edge.

2. The dielectric ceramic composition as set forth in claim 1, wherein Csi and Cso satisfy the following relational expression (1):

$$0 \text{ atom \%} < Csi - Cso \leq 1 \text{ atom \%} \tag{1}$$

where:
   Csi is said first local maximum value of Cs in said intermediate section; and
   Cso is said second local maximum value of Cs in said outside edge.

3. The dielectric ceramic composition as set forth in claim 1, wherein:

said subcomponent elements comprise at least one rare-earth element selected from Y, La, Ce, Pr, Nd, Sm, Eu, Gd, Tb, Dy, Ho, Er, Tm, Yb, Lu, Pr and Sc, and said Cs is a total concentration of rare-earth elements in an arbitrary position in the dielectric particle.

4. The dielectric ceramic composition as set forth in claim 2, wherein:

said subcomponent elements comprise at least one rare-earth element selected from Y, La, Ce, Pr, Nd, Sm, Eu, Gd, Tb, Dy, Ho, Er, Tm, Yb, Lu, Pr and Sc, and said Cs is a total concentration of rare-earth elements in an arbitrary position in the dielectric particle.

5. The dielectric ceramic composition as set forth in claim 1, wherein:

said subcomponent elements comprise at least Mg, and said Cs is a concentration of Mg in an arbitrary position in the dielectric particle.

6. The dielectric ceramic composition as set forth in claim 2, wherein:

said subcomponent elements comprise at least Mg, and said Cs is a concentration of Mg in an arbitrary position in the dielectric particle.

7. The dielectric ceramic composition as set forth in claim 3, wherein:

said subcomponent elements comprise at least Mg, and said Cs is a concentration of Mg in an arbitrary position in the dielectric particle.

8. A dielectric ceramic composition comprising:

a main component having a perovskite-type crystal structure represented by a general formula $ABO_3$; and at least one or more subcomponent elements, the subcomponent elements comprising at least Mg;

wherein:

said dielectric ceramic composition has a dielectric particle and a grain boundary;

said dielectric particle has a main component phase substantially composed of said main component, and a diffusive phase around said main component phase in which at least one selected from said subcomponent elements is diffused;

when said dielectric particle is cut on an arbitrary cutting plane including said main component phase:

a first local maximum value of Cs exists in an intermediate section which is between a position corresponding to a length of 10% of a length "D" of a cross-sectional line from an outside edge of the particle and a position corresponding to a length of 30% of the length "D" of said cross-sectional line from said outside edge, a local minimal value of Cs is located at a side of the outside edge with respect to a position of said first local maximum value of Cs, and Cs is increased from a position of said local minimal value of Cs toward said outside edge, and a second local maximum value of Cs exists in the outside edge of said dielectric particle;

Cs is a concentration of Mg in an arbitrary position in the dielectric particle; and "D" is defined as a length of a cross-sectional line from an arbitrary outside edge of the dielectric particle in said cutting plane passing through a centroid of the main component phase in said cutting plane to a facing arbitrary outside edge.

* * * * *